Jan. 17, 1933. S. COOPER 1,894,346
METHOD OF MAKING TEA BAGS
Filed April 6, 1932  2 Sheets-Sheet 1

INVENTOR.
Simon Cooper
BY Ramsey + Kent
his ATTORNEYS.

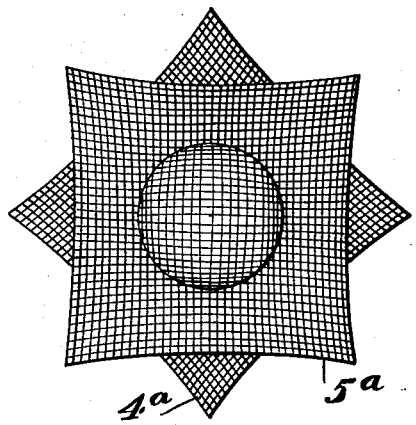
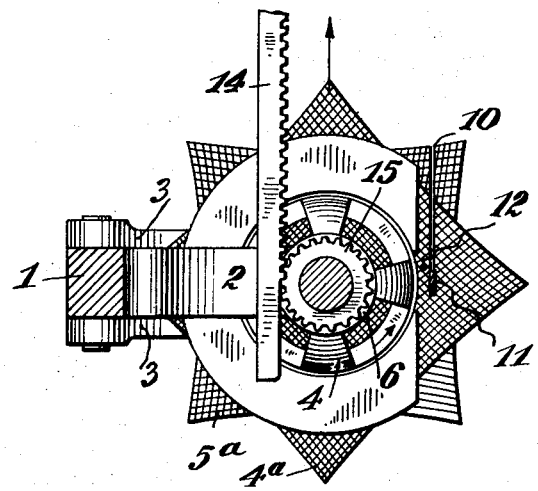
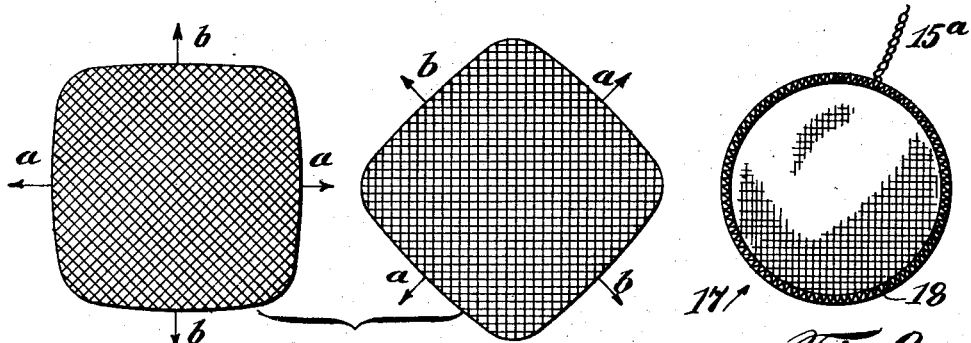
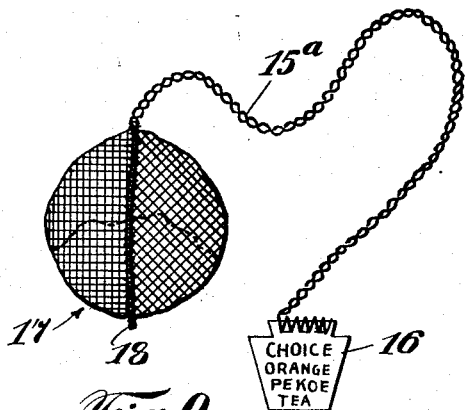
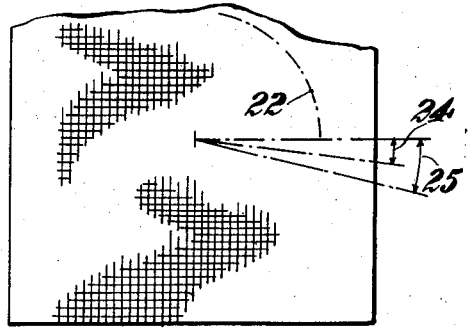

Patented Jan. 17, 1933

1,894,346

UNITED STATES PATENT OFFICE

SIMON COOPER, OF BROOKLYN, NEW YORK, ASSIGNOR TO COOPER TEA PACKET CO. INC., OF BROOKLYN, NEW YORK, A CORPORATION OF NEW YORK

METHOD OF MAKING TEA BAGS

Application filed April 6, 1932. Serial No. 603,651.

This invention relates to tea bags and methods of making the same. The "tea bag" might be more appropriately termed a "tea packet" since it is ordinarily made and marketed with the tea in it. However, it is customarily called a "tea bag". Usually the bags are of a size suitable for brewing one or two cups of tea, and are referred to as individual tea bags. The bags, however, may be of larger sizes for use by hotels, restaurants, etc., in making ice tea in bulk.

Heretofore various forms of gauze or fabric bags have been used as individual tea bags. These prior art bags have been more or less satisfactory in some respects; but they have had disadvantages, including cost, appearance, and objectionable effect upon the flavor of the brew. Since individual tea bags are used only once and then thrown away, low cost is of prime commercial importance, and small fractions of a cent per bag may be vital. Anything besides tea leaves which is introduced into the brew affects the flavor and one of the problems has been to so minimize the flavor effect of the gauze or fabric as to render it unobjectionable. Obviously the more gauze or other material that is present in the tea bag, the more the material of the bag affects the flavor of the brew. On the other hand, it is very desirable that the gauze or other material of the bag shall provide sufficient space within the bag to permit free expansion of the tea leaves so that all of the leaves will be exposed to the hot water for quick and complete extraction of tea essence. Attempts have been made to minimize the flavor of the bag material by using specially treated gauze or fabric but this increases the cost and does not eliminate the adverse flavor to the extent that is desirable.

A type of bag which is much used is a square bag made from two layers of fabric overseamed together. This bag has various advantages, but in use, it has one very annoying disadvantage. With this type of bag, the squares of cloth have to be fairly large to give adequate space for expansion of the tea leaves. When the bag is removed from a tea cup and placed on the saucer, one of the corners often projects over the edge of the saucer and from it tea drips onto the table cloth.

A principal object of the present invention is to provide a method of making a tea bag which provides ample surplus space for the expansion of the tea while requiring a minimum amount of bag making material for a given volume of bag, thus saving material and minimizing the amount of extraneous material introduced into the brew.

Another object of the invention is to provide a low cost tea bag and/or method of making the same.

A secondary object of the invention is to improve the appearance of individual tea bags.

Other objects of the invention will be obvious from the present disclosure.

In the form of the invention disclosed a generally spherical bag is produced by overseaming together two hemispherical pieces of bag making material. Ordinarily, the bag making material will be gauze or fabric but other materials such as perforated papers or cellophane may be used. The two halves of the bag may be made hemispherical in any suitable manner. The material may be preliminarily cupped and then (optional) it may be additionally circumferentially gathered at or prior to the sewing operation. Of course, where limp material is used, the bag will not initially stand in spherical form, because it is only partially filled with tea leaves. However, the bag is adapted to be distended into spherical form without any substantial internal pressure being exerted upon it. Thus in brewing, the tea leaves are permitted to expand without restraint, the bag readily assuming spherical form and thereby providing maximum space for the expansion. For satisfactory and economical brewing the total volume of the bag should provide for 3:1 expansion. In Figs. 8 and 9 of the drawings, the bags are shown distended for the sake of clarity.

Fig. 1 of the drawings shows two squares of fabric as cut from two supply rolls preparatory to forming them into a tea bag.

Fig. 5 is a plan view showing the relationship between the two cupped squares of cloth as held together in Fig. 4.

Fig. 6 illustrates diagrammatically the manner of sewing and trimming the bag.

Fig. 7 shows two halves taken from a finished fabric bag, and separated and flattened out.

Fig. 8 is a plan view of a finished bag with the stitching lying in a horizontal plane.

Fig. 9 is a side view of the finished bag with the stitching lying in a vertical plane perpendicular to the paper.

Fig. 10 illustrates diagrammatically the effective circumferential constriction of the cloth in the forming of the bag.

Figure 1:
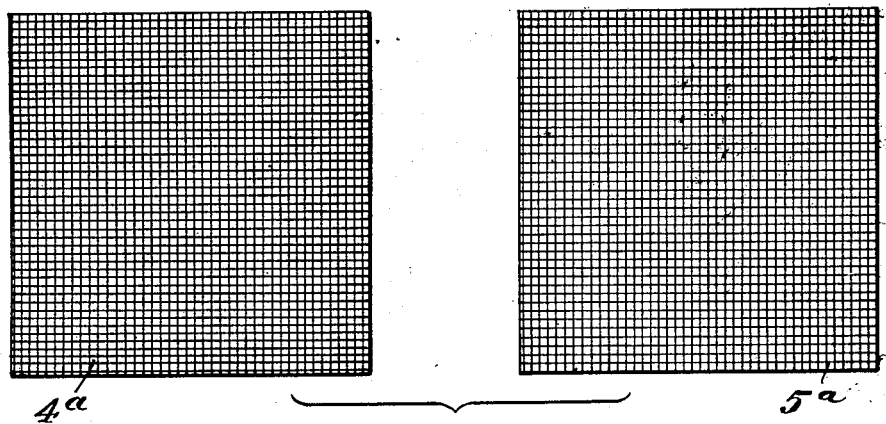
Figure 2:
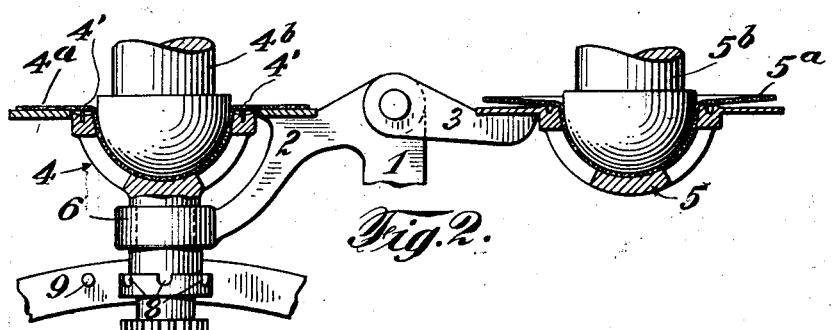
Fig. 2 illustrates more or less diagrammatically cupping of the two squares of fabric prior to charging with tea and sewing them together.
Figure 3:
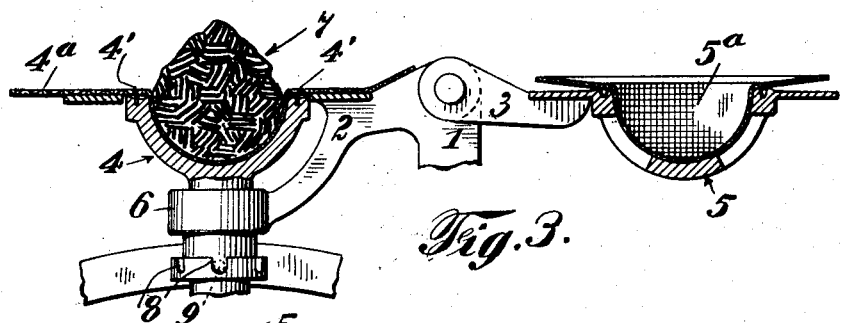
Fig. 3 shows more or less diagrammatically the step of charging the bag with tea.
Figure 4:
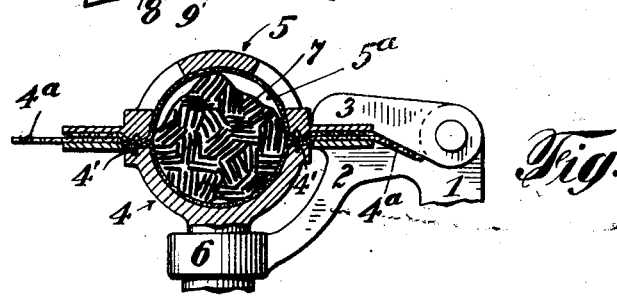
Fig. 4 shows more or less diagrammatically the two halves of a charged bag held together for sewing.

In Figs. 2, 3, and 4, there is a support 1 to which is secured arms 2 and 3; and associated respectively with the arms 2 and 3 are similar hemispherical mold sections 4 and 5. The mold section 4 is rotatably supported at 6 and the arm 3 is so pivoted that the mold section 5 may be swung into registry with the mold section 4, as shown in Fig. 4.

With the mold sections 4 and 5 in the relative position shown in Fig. 2, the squares of cloth 4$^a$ and 5$^a$ are applied over the respective mold sections 4 and 5. Plungers 4$^b$ and 5$^b$ are thrust into the respective mold sections and press portions of the fabric 4$^a$ and 5$^a$ into hemispherical form. The plungers are withdrawn, leaving the fabric conforming to the mold sections; and then a charge of tea 7 is inserted into the cup of the fabric 4$^b$. At about the same time mold section 4 is rotated in its bearing 6 through an angle of 45 degrees in any suitable manner, as by one of the recesses 8 engaging a fixed pin 9. Arm 3 is then swung on its pivot, bringing the mold sections into registry, as shown in Fig. 4. Due to the 45 degree rotation of mold section 4, the two cupped sections of cloth 4$^a$ and 5$^a$ are held by the mold sections in the relative positions shown in Fig. 5 in which the normal direction of the threads in one piece of fabric makes an angle of 45 degrees with the normal direction of the threads in the other piece of fabric. The purpose and advantage of this relative position of the two pieces of fabric will be discussed later.

The two cupped and filled pieces of fabric held in the mold sections as shown in Fig. 4 are now stitched together and the edges trimmed, as will be explained in connection with Fig. 6. By suitable means such as a cutting tool 11, a tangential cut is made, beginning at point 10; and sewing is then commenced at point 12. The two sections of the molded cloth are now rotated in unison by suitable means such as rack 14 and pinion 15 which rotate mold section 4 and through pins 4' rotate the fabric 4$^a$ and 5$^a$. As the two pieces of fabric rotate, they are sewed together in a circular path, the cutter 11 trimming off the margin, also in a circular path. Preferably, the sewing is done with an overseam sewing machine so that the sewing threads overlap the cut edges of the cloth and prevent ravelling. Machines for overseaming two pieces of cloth together and trimming the surplus material as the sewing progresses are well known in the art. Preferably, the bag is provided with an extension cord 15$^a$ to which is attached a tag 16 for suspending the bag in a cup of tea; and this cord may be produced by chaining off the stitching after the complete circumference of the bag has been sewed and then continuing the stitching through the tag 16.

The completed bag 17 is circular in cross section and consists of two hemispheres of cloth having their edges over-seamed together at 18, as shown in Figs. 8 and 9. If the material of the bag be limp (e. g. gauze), the bag may assume a semi-collapsed state, but the two halves of the bag are pre-shaped into hemispherical form and the peripheries of the halves are held circular by the circular line of over-seaming 18 (see Fig. 8). Thus the bag is adapted to be distended into spherical form, as shown in Fig. 9, and will automatically assume such form when the tea expands in brewing.

To make the bag spherical, the fabric in the finished bag is in a state of circumferential constriction as compared to the flat piece of cloth from which the bag was formed. Circumferential constriction takes place when the cloth is cupped, and further circumferential constriction may be effected during the sewing operation. When the fabric is forced into the semi-circular mold sections 4 and 5, there is little yielding of the threads in the direction of their length, but the threads shift locally in such manner as to (in effect) stretch the cloth on the bias, i. e. diagonally of the threads. Accordingly, if the sewing be removed from a finished bag and the two halves of the bag be flattened out, they will not be circular, but will be approximately of the form shown in Fig. 7.

The cupping so stretches the fabric along the axes $a$—$a$ and $b$—$b$, that the periphery of the cupped blank is circular; and the periphery of the finished bag is held circular and constricted by the circular line of over-seaming 18. However, if the two halves of the bag had the threads of the fabric in alignment, the axis of stretching $a$—$a$ and $b$—$b$ of the two halves would resigster; and I have found that this has an undesirable resultant effect on the finished bag. When removed from the mold sections 4 and 5, the cloth has a tendency to contract along the axes a—a and b—b; and if these axes register in the two halves of the bag, a very uneven and wavy contour is impressed on the line of stitching 18. This is avoided by so positioning the two halves that the threads in one half make an angle of 45 degrees with the threads of the other half, as indicated in Figs. 5 and 7. Then the axes of distortion a—a and b—b of one half of the bag are angularly staggered with the corresponding axes of the other half of the bag, with the result that the tendency to distortion in one half of the bag effectively compensates for the tendency to distortion in the other half. Thus, the circular line of stitching 18 in the finished bag will lie in a single plane without waves or distortion.

The effective circumferential gathering of the cloth is illustrated diagrammatically in Fig. 10, in which the arc 22 respresents the circumferenece on which the two halves of the bag are to be stitched together. However, the area of cloth in the trimmed blank must be greater than the area which would be enclosed by a circle corresponding to the arc 22. Thus, the cloth must be circumferentially constricted, either before or at the time of sewing, in such manner that (in effect) an arc of cloth 25 is brought within the range of an arc of stitching 24. In the method disclosed herein the primary circumferential constriction of the cloth is effected by cupping it, but since the cupping does not extend over the entire surface of the blank, further circumferential constriction may be desirable in some cases. This further circumferential constriction can be effected during the sewing operation by feeding to the sewing mechanism at each stitch a linear amount of material greater than the linear length of the stitch.

The present application is a continuation in part of my application S. No. 528,029, filed April 6, 1931. It will be seen that in common with the invention disclosed in that application, the present invention provides a tea bag which is adapted to be distended into spherical form when the tea is brewed. Thus, the bag produced by the inventions requires the minimum amount of extraneous material for a given volume of bag, thereby providing a bag which gives adequate expansion space for the tea leaves, with the introduction of the mathematical minimum amount of gauze or other bag-making material into the brew. In addition, the present invention so balances the tendency to distortion of one half of the bag against the tendency to distortion of the other half of the bag that a much more marketable and commercially practical bag is produced.

It is obvious that many detailed variations may be effected in the method of making the bag, and it is also obvious that the method of making the bag may either be carried out wholly by hand or by means of various mechanisms which perform one or more steps in the method. Of course, in quantity production, the method will preferably be carried out by automatic or semi-automatic machinery. Accordingly, the foregoing disclosure is merely illustrative in compliance with the patent statutes and is not to be considered as limiting.

What I claim is:—

1. The method of making a tea bag which comprises circumferentially gathering two pieces of fabric to produce reduced circumferences, superimposing the two reduced circumferences with the threads of one piece of fabric at an angle of approximately 45 degrees to the threads of the other piece of fabric, and stitching the two pieces of fabric together along the reduced circumferences, whereby the resultant bag is adapted to be distended into spherical form.

2. The method of making a tea bag which comprises forming substantially hemispherical cups in each of two pieces of fabric, placing a quantity of tea in one of the cups, applying the other cup over the charge of tea with the threads of one piece of fabric lying at an angle of substantially 45 degrees to the threads of the other piece of fabric, stitching the two pieces of fabric together in a circular path, and trimming the fabric also in a circular path.

3. The method of making a tea bag which comprises circumferentially gathering two pieces of fabric to produce reduced circumferences, placing a charge of tea between the two pieces of fabric and correlating the two pieces of fabric with the threads of one piece at an angle of substantially 45 degrees to the threads of the other piece, over-seaming the two pieces together along said reduced circumference, and trimming the fabric in a circular path adjacent the over-seam.

4. The method of making a tea bag which comprises forming each of two pieces of fabric into generally hemispherical form, assemblying the two pieces with the threads of one piece lying at an angle to the threads of the other piece, and then over-seaming the two pieces together.

SIMON COOPER.